Patented Sept. 25, 1928.

1,685,629

UNITED STATES PATENT OFFICE.

EUGENE T. DRAKE, OF OMAHA, NEBRASKA, ASSIGNOR TO THE CUDAHY PACKING COMPANY, OF CHICAGO, ILLINOIS, A CORPORATION OF MAINE.

PROCESS FOR THE PRODUCTION OF NITRITES.

No Drawing.     Application filed February 3, 1926.     Serial No. 86,963.

The invention relates to the production of nitrites, and specifically to the bacteriological decomposition of nitrates, the object of the invention being the more rapid, economical and efficient production of said nitrites.

I have found that nitrites may be produced from nitrates by operating in the following manner.

A first or preliminary culture is prepared of an aqueous solution, for example, of 2 to 8% sodium nitrate, ½ to 20% of sugar, ½ to 17% common salt. This solution should contain a protein material in some form including amino nitrogen from 5/100 to 2%; it may be added in the form of peptone or by using a sterilized second pickle containing meat juices. The hydrogen ion concentration of this medium is adjusted to between 5 and 10. This medium is rendered sterile by heating at a suitably high temperature for about twenty minutes.

This preliminary culture is then inoculated with pure cultures of one or more of a group of bacilli or spirilli which, among other characteristics, have that of converting nitrates into nitrites. These organisms comprise bacilli for the greater part, but also some spirilli; they have not hitherto been isolated or classified, but may be identified by the following characteristics:

They are non-putrefactive.
They are non-pathogenic.
They are nitrate-reducing.
They are non-proteolytic.
They are motil and non-motil.
They are salt-tolerant.
They are either bacilli or spirilli.

These selected organisms are prepared in pure culture according to the usual practice in bacteriological laboratories from various and well known sources. The pure cultures of the above mentioned organisms are cultivated and kept growing upon the customary media used in the laboratory and under the usual conditions of propagation.

As stated, the preliminary culture above described is inoculated with this selected organism, and in order that the conversion from nitrates into nitrites shall take place uninterruptedly and satisfactorily this and succeeding cultures must be contained in a pure culture. They are then allowed to propagate in suitable containers, for example, those the material of which does not retard, injure or destroy the growth. For propagating these pure cultures the containers are maintained at temperatures between 70 and 110° F., altho success has been attained with a temperature as low as 34° F. During growth the nitrate is converted into nitrite and the sugar is fermented to carbon dioxide and acids, which is a change induced by the pure cultures of the bacteria added. During this period of growth, the hydrogen ion content, having been modified by the formation of the above mentioned acids, which modification or decrease retards the growth of the specific organisms involved, must be constantly adjusted to the limits mentioned above, and this may be done in any suitable and well known manner. It is, of course, understood that the pure culture may be added in any amount.

A second culture is then prepared in exactly the same manner as that described for the preliminary culture, the quantity thereof being approximately twenty times that of the preliminary culture. About 1% of the preliminary culture is added to this second culture, which is allowed to grow under the same conditions of temperature and for the same period of time as the preliminary culture.

A third culture is then prepared in the same manner as the preliminary and second culture, this third culture being approximately twenty times the amount of the second culture; to this third culture is added about 1% of the second culture, which is allowed to grow from 24 to 48 hours, the hydrogen ion concentration being adjusted and maintained as in the previous cultures; it is then ready for use in the final or working culture.

In these three cultures it is highly advantageous that a constant supply of oxygen be supplied, which may be done for example by aeration.

For the final or working culture, viz, that to be manufactured for use or sale, a solution is prepared in quantities suitable for the amount of nitrite to be produced, to which 1 to 3% of the third culture is added. This solution is of the same composition as the solutions used in the preliminary culture, and also in the second and third cultures. The culture which, as stated, is taken from the third culture, is allowed to grow in the solution for approximately six days at a temperature of from 70 to 110° F., oxygen being constantly added, preferably by aeration, and the hydrogen ion value being maintained as in preceding cultures. The culture is allowed to grow until practically all the nitrate has been converted into nitrite through the action of the previously mentioned selected organisms. This growth being completed the working culture is heated to sterilization temperature and the action of the bacteria completely arrested. This solution of nitrite is then ready for use per se or may be converted into solid form, a salt, for example, by well known evaporating and refining methods. By controlling the amount of sugar and salt used in the working culture is is possible to control the residual quantities of these ingredients in the finished product.

It is to be understood that the invention is not limited to the exact constituents, proportions and time intervals set forth. For example, other nitrates may be used instead of sodium nitrate, and the sugar used may be of any type. It is possible to vary the time of growth in the preliminary culture and the second and third cultures, increase the number of cultures or change the ratio of the factors to control or accelerate the rate of growth, but the time intervals and quantity ratios given have been found generally preferable. In the preliminary cultures the rate of growth of the bacteria and the number produced is determined by analysis and number of bacteria present showing the rate of denitrification.

I claim:—

1. A bacteriological process for the conversion of nitrates into nitrites which comprises inoculating a series of cultures formed of an aqueous solution of sodium nitrate, sugar, common salt and amino nitrogen, with selected groups of non-putrefactive, non-pathogenic, nitrate-reducing, non-proteolytic, motil and non-motil, salt-tolerant bacilli having the property of converting nitrates into nitrites.

2. A bacteriological process for the conversion of nitrates into nitrites which comprises inoculating a series of cultures formed of an aqueous solution of sodium nitrate, sugar, common salt and amino nitrogen, with selected groups of non-putrefactive, non-pathogenic, nitrate-reducing, non-proteolytic, motil and non-motil, salt-tolerant spirilli having the property of converting nitrates into nitrites.

3. A process for the production of nitrites which comprises the selection of certain types of bacteria having properties described in claim 1, inoculating with said bacteria a preliminary culture prepared as set forth in claim 1, allowing this preliminary culture to grow for a specified period of time under specific conditions of temperature, utilizing 1% of this preliminary culture for the formation of a second culture prepared in the same manner as the preliminary culture, but in amount 20 times as great, allowing this second culture to grow under the same conditions as the preliminary culture; utilizing about 1% of this second culture to produce a third culture under the same conditions as the second culture, oxygen being preferably added during the process of producing all three cultures; utilizing 1 to 3% of this third culture for producing a final or working culture, in which the action of the organisms selected is allowed to continue until the nitrates are converted into nitrites.

4. A process for the production of nitrites which comprises the selection of certain types of bacteria having properties described in claim 1, inoculating with said bacteria a preliminary culture prepared as set forth in claim 1, allowing this preliminary culture to grow for a specified period of time under specific conditions of temperature, utilizing 1% of this preliminary culture for the formation of a second culture prepared in the same manner as the preliminary culture, but in amount 20 times as great, allowing this second culture to grow under the same conditions as the preliminary culture; utilizing about 1% of this second culture to produce a third culture under the same conditions as the second culture, oxygen being preferably added during the process of producing all three cultures; utilizing 1 to 3% of this third culture for producing a final or working culture, in which the action of the organisms selected is allowed to continue until the nitrates are converted into nitrites, and reducing the solution containing the nitrites to solid form.

In testimony whereof I have hereunto set my hand.

EUGENE T. DRAKE.